US012678881B2

(12) United States Patent
Fettke et al.

(10) Patent No.: US 12,678,881 B2
(45) Date of Patent: Jul. 14, 2026

(54) LASER-ASSISTED SOLDERING APPARATUS AND SOLDER DEPOSITION MACHINE

(71) Applicant: Pac Tech—Packaging Technologies GmbH, Nauen (DE)

(72) Inventors: Matthias Fettke, Berlin (DE); Jan Hoffmann, Michendorf (DE)

(73) Assignee: Pac Tech—Packaging Technologies GmbH, Nauen (DE)

( * ) Notice: Subject to any disclaimer, the term of this patent is extended or adjusted under 35 U.S.C. 154(b) by 937 days.

(21) Appl. No.: 17/900,718

(22) Filed: Aug. 31, 2022

(65) Prior Publication Data

US 2023/0105144 A1 Apr. 6, 2023

(30) Foreign Application Priority Data

Oct. 6, 2021 (LU) ....................................... 500711

(51) Int. Cl.
B23K 3/06 (2006.01)
B23K 1/005 (2006.01)

(52) U.S. Cl.
CPC .......... B23K 3/0623 (2013.01); B23K 1/0056 (2013.01)

(58) Field of Classification Search
CPC ................................. B23K 1/0056; B23K 3/08
See application file for complete search history.

(56) References Cited

U.S. PATENT DOCUMENTS

| | | | |
|---|---|---|---|
| 6,198,070 B1 | 3/2001 | Nakayama | ............. B23K 26/00 |
| | | | 219/121.68 |
| 10,286,470 B2 | 5/2019 | Azdasht | |
| 10,826,470 B2 | 11/2020 | Zuo et al. | ................ H03K 4/56 |
| 12,028,987 B2 * | 7/2024 | Fettke | .................. H05K 3/3468 |

(Continued)

FOREIGN PATENT DOCUMENTS

| | | |
|---|---|---|
| CN | 102085590 A | 6/2011 |
| CN | 103358020 A | 10/2013 |

(Continued)

OTHER PUBLICATIONS

JP 2006305634 Translation (Year: 2006).*

(Continued)

*Primary Examiner* — Woody A Lee, Jr.
(74) *Attorney, Agent, or Firm* — Imperium Patent Works; Darien K. Wallace

(57) ABSTRACT

A laser-assisted soldering apparatus includes a solder jetting section and a laser coupling unit. The solder jetting section includes a jetting nozzle and a solder body holding capillary adapted to hold a solder body that is being liquefied by a laser beam. The laser coupling unit includes an optical window, a laser entry, a laser passage, a fastening section, and a laser exit. The laser passage extends from the laser entry to the laser exit and is aligned with the solder body holding capillary. The optical window is transparent to the laser beam. The fastening section is fastened to the solder jetting section. A first pressure gas feeding passage merges into the laser passage between the optical window and the (Continued)

fastening section. The solder jetting section includes a second pressure gas feeding passage that merges into the solder body holding capillary between the laser exit and the jetting nozzle.

11 Claims, 3 Drawing Sheets

(56) References Cited

U.S. PATENT DOCUMENTS

| | | | | |
|---|---|---|---|---|
| 2004/0226985 A1 * | 11/2004 | Fukunaka | ............ | B23K 1/0056 228/180.5 |
| 2006/0219760 A1 * | 10/2006 | Wagoh | ................. | H05K 3/3478 228/248.1 |
| 2007/0075056 A1 | 4/2007 | Ho et al. | ................. | B23K 26/00 219/121.66 |
| 2009/0001054 A1 | 1/2009 | Mizuno et al. | .......... | B23K 1/00 219/78.13 |
| 2010/0089981 A1 | 4/2010 | Matsumoto et al. | .... | B23K 1/00 228/245 |
| 2011/0132879 A1 | 6/2011 | Matsumoto et al. | .... | B23K 9/04 219/76.1 |
| 2013/0256277 A1 | 10/2013 | Li | ......................... | B23K 1/005 219/74 |
| 2016/0279725 A1 | 9/2016 | Azdasht | | |
| 2016/0354853 A1 | 12/2016 | Azdasht | | |
| 2017/0165773 A1 | 6/2017 | Azdasht et al. | | |
| 2020/0083063 A1 * | 3/2020 | Shin | .................... | H01J 37/3244 |

FOREIGN PATENT DOCUMENTS

| | | | | | |
|---|---|---|---|---|---|
| CN | 105108264 A | | 12/2015 | | |
| CN | 105813790 A | | 7/2016 | | |
| CN | 106536110 A | | 3/2017 | | |
| CN | 109590561 A | * | 4/2019 | ........... | B23K 1/0056 |
| CN | 110740831 A | | 1/2020 | | |
| CN | 110814458 A | | 2/2020 | | |
| CN | 111299738 A | | 6/2020 | | |
| CN | 111761212 A | | 10/2020 | | |
| CN | 111872510 A | | 11/2020 | | |
| CN | 112453621 A | | 3/2021 | | |
| CN | 213497198 U | | 6/2021 | | |
| CN | 114503791 A | * | 5/2022 | ............. | H05K 3/328 |
| CN | 115070154 A | * | 9/2022 | .............. | B23K 3/00 |
| DE | 102022109905 A1 | * | 10/2022 | .............. | H05K 3/00 |
| EP | 0457920 A1 | | 11/1991 | | |
| JP | H02-055662 A | | 2/1990 | | |
| JP | H10-058172 A | | 3/1998 | | |
| JP | 2000 042780 A | | 2/2000 | | |
| JP | 2006305634 A | * | 11/2006 | | |
| JP | 2008-264844 A | | 11/2008 | | |
| JP | 2010-089159 A | | 4/2010 | | |
| JP | 2010-253496 A | | 11/2010 | | |
| JP | 2010-06899 A | | 2/2021 | | |
| KR | 10-2016-0098218 | | 8/2016 | | |
| KR | 10-1947498 B1 | | 2/2019 | | |
| KR | 10-1963216 | | 3/2019 | | |

OTHER PUBLICATIONS

Office action of the Japanese Patent Office in the related Japanese patent application JP2022-129589 dated Jun. 13, 2023, as well as the English translation of the Japanese Office action (10 pages).
Search Report dated Jun. 7, 22 from the Luxembourg Patent Office in the related foreign application LU 500711 (9 pages).
Notice of Allowance of the Japanese Patent Office in the related Japanese Patent application JP2022-129589 dated Sep. 5, 2023 (3 pages).
Notification of Grant of Patent Rights of the Chinese Patent Office in the related Chinese patent application CN 202211119402.4 dated Nov. 18, 2025 (6 pages).
Office action of the Korean Patent Office in the related Korean patent Application KR10-2022-0124006 dated Feb. 19, 2024 (9 pages).

* cited by examiner

LASER-ASSISTED SOLDERING APPARATUS AND SOLDER DEPOSITION MACHINE

CROSS REFERENCE TO RELATED APPLICATION

This application is based on and hereby claims the benefit under 35 U.S.C. § 119 from Luxembourg Patent Application No. LU500711, filed on Oct. 6, 2021, in the Luxembourg Intellectual Property Office. This application is a continuation-in-part of Luxembourg Patent Application No. LU500711, the contents of which are incorporated herein by reference.

TECHNICAL FIELD

The present disclosure relates to a laser-assisted soldering apparatus that includes a solder jetting section having a solder body holding capillary for holding a solder body to be liquefied by a laser beam and a laser coupling unit for coupling the laser beam into the laser-assisted soldering apparatus. Further, the disclosure relates to a solder deposition machine.

BACKGROUND

Apparatuses for applying solder bodies, i.e., solder balls, are well known from the prior art. In this context, reference is made, for example, to U.S. Pat. No. 10,286,470 B2. This document discloses an apparatus for the separate application of solder material deposits. In such an apparatus, a capillary is usually filled with individual solder balls, and the solder balls are melted from there and applied individually to the corresponding electronic component to be manufactured. The solder balls are usually pushed into the capillary by using pressurized gas.

However, it has been shown that during melting of the solder body in the capillary and during deposition of the liquefied solder body onto the electronic component, a contamination stream could flow inside the capillary against a feeding direction of the laser beam, for example away from the electronic component to be soldered. The contamination containing smoke, solder splatter, and particulate matter may be deposited on components closer to the laser source, such as a window provided at the entrance of a laser passage of the apparatus. This in turn has a negative effect on the efficiency of the heating process of the solder body that uses a laser beam.

It is therefore an object of the present disclosure to minimize the maintenance effort of an apparatus that uses laser beam for applying solder bodies.

SUMMARY

A laser-assisted soldering apparatus comprises a solder jetting section having a solder body holding capillary for holding a solder body to be liquefied by a laser beam, and a laser coupling unit comprising a body with a laser passage extending lengthwise through the body. An optical window transparent for the laser beam is provided at the side of a laser entry, and a fastening section fastened to the laser-assisted soldering apparatus is provided at the side of a laser exit. A pressure gas feeding passage is connected to the laser passage. The laser passage is connected to and aligned with the solder body holding capillary. The solder jetting section is provided with a pressure gas feeding passage being connected to the solder body holding capillary.

In one embodiment, a laser-assisted soldering apparatus includes a solder jetting section and a laser coupling unit. The solder jetting section includes a jetting nozzle and a solder body holding capillary adapted to hold a solder body that is being liquefied by a laser beam. The laser coupling unit includes an optical window and a body with a laser entry, a laser passage, a fastening section, and a laser exit. The laser passage extends lengthwise through the body from the laser entry to the laser exit. The optical window is disposed towards the laser entry and is transparent to the laser beam. The fastening section is disposed towards the laser exit and is fastened to the solder jetting section. A first pressure gas feeding passage merges into the laser passage at a first connection location located between the optical window and the fastening section. The laser passage is aligned with the solder body holding capillary. The solder jetting section includes a second pressure gas feeding passage that merges into the solder body holding capillary at a second connection location located between the laser exit of the laser coupling unit and the jetting nozzle of the solder jetting section.

In one aspect, the first pressure gas feeding passage is connected to a first pressure gas reservoir, and the second pressure gas feeding passage is connected to a second pressure gas reservoir. The first pressure gas reservoir contains gas at a higher pressure than that contained in the second pressure gas reservoir.

In another embodiment, a solder deposition machine includes a laser generator, a laser coupling unit and a solder jetting section. The laser generator generates a laser beam. The laser coupling unit includes a laser entry, an optical window, a window body part, a main body part, a fastening section, a laser exit and a laser passage. The laser passage extends from the laser entry to the laser exit. The optical window is attached to the window body part and is transparent to the laser beam. A first pressure gas feeding passage merges into the laser passage at a first connection location located between the optical window and the fastening section. The solder jetting section is adapted to hold a solder body while the solder body is being liquefied by the laser beam. Upon being liquefied, the solder body is jetted from the solder jetting section. The solder jetting section includes a solder body holding capillary that is aligned with the laser passage. The laser generator directs the laser beam towards the solder body disposed in the solder body holding capillary. The fastening section is fastened to the solder jetting section.

The solder jetting section includes a jetting nozzle and a second pressure gas feeding passage. The second pressure gas feeding passage merges into the solder body holding capillary at a second connection location located between the laser exit of the laser coupling unit and the jetting nozzle of the solder jetting section. The first pressure gas feeding passage is connected to a first pressure gas reservoir, and the second pressure gas feeding passage is connected to a second pressure gas reservoir. The first pressure gas reservoir contains gas at a pressure equal to or higher than that contained in the second pressure gas reservoir. The solder body is jetted from the solder jetting section by gas pressure applied into the solder body holding capillary.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

The drawings are merely schematic in nature and are intended solely for the purpose of understanding the disclosure. For example, with regard to FIG. 5, it is noted that several "passages" are shown for the sake of simplicity as lying in a same cross-sectional plane of the laser-assisted soldering apparatus, while such "passages" actually may lie in different cross-sectional planes of the laser-assisted soldering apparatus. Reference will now be made in detail to some embodiments of the invention, examples of which are illustrated in the accompanying drawings.

Figure 3:
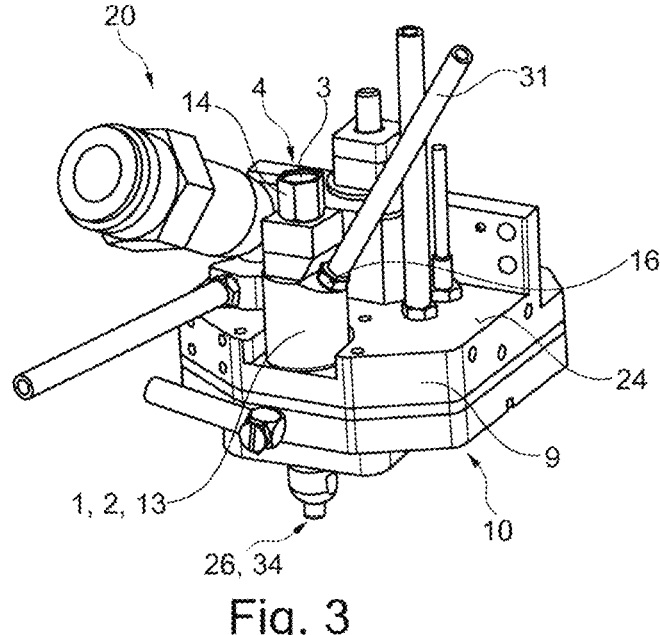
FIG. 3 shows a perspective view of a laser-assisted soldering apparatus that includes a solder jetting section and the laser coupling unit of FIGS. 1 and 2.

FIG. 3 shows a laser-assisted soldering apparatus 20 that includes a laser coupling unit 1 and a solder jetting section 10 having a solder body holding capillary 17 for holding a solder body to be liquefied by a laser beam 7. The laser coupling unit 1 couples the laser beam 7 into the laser-assisted soldering apparatus 20. The laser coupling unit 1 includes a body 2 with a laser passage 3 extending lengthwise through the body 2 from a laser entry 4 to a laser exit 5. An optical window 6 transparent to the laser beam 7 is provided on the side of the laser entry 4. A fastening section 8 fastened to the laser-assisted soldering apparatus 20 is provided on the side of the laser exit 5. A first pressure gas feeding passage 11 is connected to the laser passage 3 at a connection location 12 positioned between the window 6 and the fastening section 8. The laser passage 3 of the laser coupling unit 1 is connected to and aligned with the solder body holding capillary 17. This results in an efficiently controllable apparatus that is compact in design. Preferably the apparatus 20 is designed as a machining head for a robot.

Furthermore, the solder jetting section 10 is provided with a second pressure gas feeding passage 18 being connected to the solder body holding capillary 17 at a connection location positioned between the laser exit 5 and a jetting nozzle of the solder body holding capillary 17. This cleverly improves the specific control of the solder jetting section 10.

Consequently, by using the laser coupling unit 1 in the laser-assisted soldering apparatus 20, an additional gas pressure port is provided to generate an additional pressure gas stream directed against an occurring contamination stream. This avoids the deposition of residues on the window 6 during the laser operation and the soldering process. The service life of the window 6 increases, and the continuously increasing optical losses due to increasing contamination on the window surface are avoided or at least significantly slowed.

In one embodiment of the apparatus 20, the first pressure gas feeding passage 11 of the laser coupling unit 1 and the second pressure gas feeding passage 18 of the solder jetting section 10 are connected to a common pressure gas reservoir. This helps to further reduce the complexity of the apparatus.

In another embodiment of the apparatus 20, the first pressure gas feeding passage 11 of the laser coupling unit 1 is connected to a different pressure gas reservoir than the second pressure gas feeding passage 18 of the solder jetting section 10. This allows an improved control of the apparatus.

According to an aspect of the present disclosure with respect to the apparatus 20, a first pressure gas reservoir 19$a$ connected to the first pressure gas feeding passage 11 of the laser coupling unit 1 has the same pressure or a higher pressure than a second pressure gas reservoir 19$b$ connected to the second pressure gas feeding passage 18 of the solder jetting section 10. This additionally helps to avoid a contamination stream being directed towards the window 6 of the laser coupling unit 1.

According to an aspect of the present disclosure, the body 2 of the laser coupling unit 1 is tubular. As a consequence, the laser coupling unit 1 has a compact form that can be arranged on the apparatus 20 in a space-saving manner.

In another embodiment, an outlet of the pressure gas feeding passage 11 is pointed to the laser exit 5. This enables an even more compact design.

In another embodiment, the first pressure gas feeding passage 11 extends linearly and at an acute angle to the laser passage 3. This allows a place saving fixation of a respective pipeline towards a pressure gas reservoir.

According to a further aspect of the present disclosure, the first pressure gas feeding passage 11 extends linearly and perpendicular to the laser passage 3. This allows a compact design of the body 2 in its longitudinal direction.

According to a further aspect of the present disclosure, it advantageous for the laser passage 3 to extend completely linearly/straight through the entire body 2. This helps to keep the structure of the body 2 as simple as possible and therefore simplifies the manufacturing process.

In one embodiment, the body 2 includes a main body part 13 provided with the fastening section 8 as well as a window body part 14 that holds the window 6. Preferably, the window body part 14 is (more preferably releasably) attached to the main body part 13 at a side opposite the fastening section 8. This further reduces the manufacturing effort.

In one aspect of the laser coupling unit 1, the window body part 14 is attached to the main body part 13 via a screw connection 15. Preferably the window body part 14 is provided with a threaded portion that is screwed into a female thread of the main body part 13. This also reduces the maintenance effort.

In one aspect, the body 2 includes a pressure gas connection body part 16 for feeding pressure gas to the first pressure gas feeding passage 11, wherein the pressure gas connection body part is joined, preferably releasably, to the body 2. This facilitates the connection to a pipeline towards a pressure gas source.

In one embodiment, the fastening section 8 of the laser coupling unit 1 is formed as threaded socket. This allows an easy and quick installation of the laser coupling unit 1 onto the laser-assisted soldering apparatus 20.

Furthermore, the present disclosure discloses a solder deposition machine 21 that includes the laser-assisted soldering apparatus 20 according to any of the preceding aspects and a laser generating device 23 arranged and configured for producing a laser beam 7 for beaming inside the laser passage 3.

Figure 5:
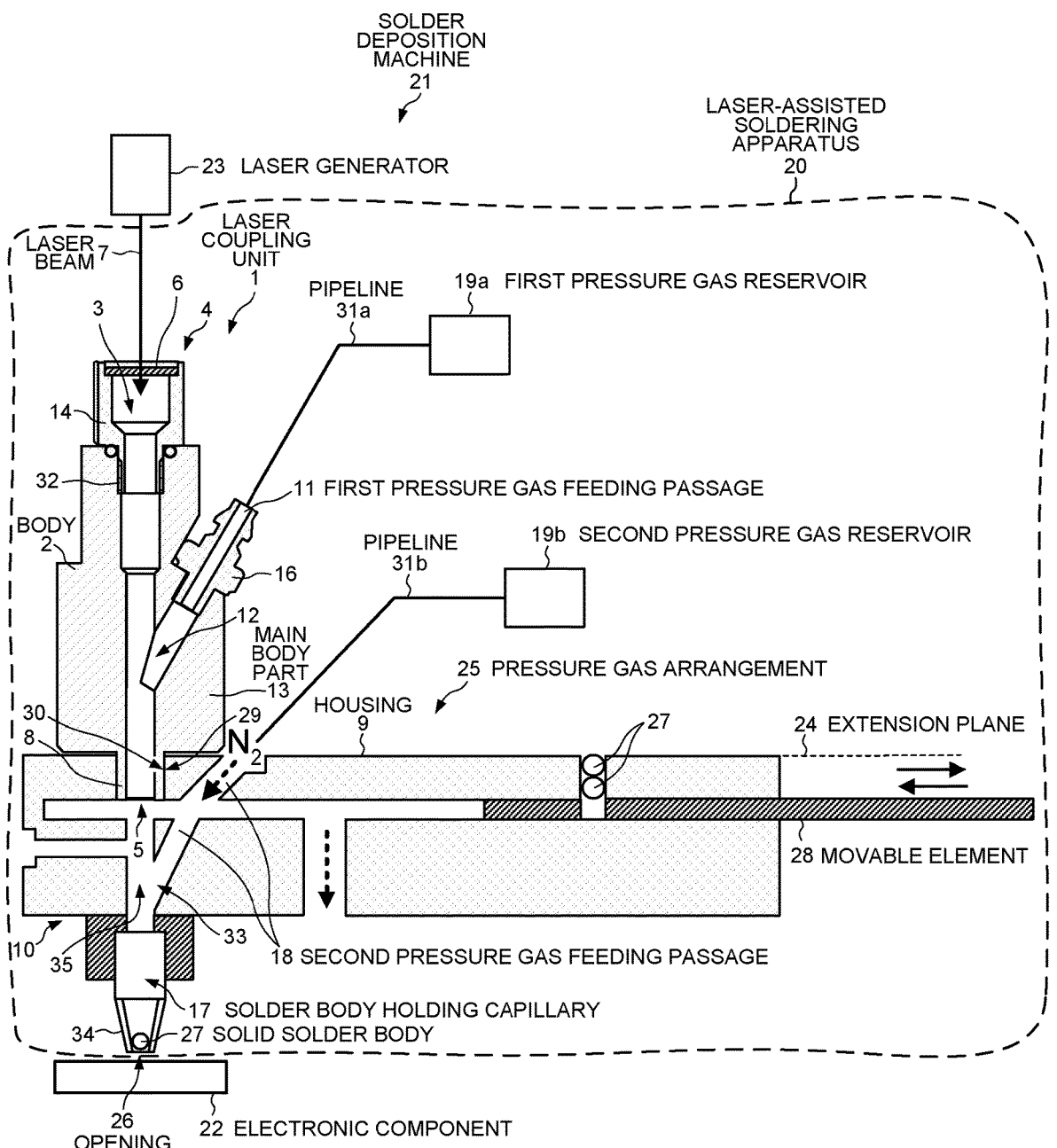
FIG. 5 shows a cross-sectional view of the apparatus of FIG. 3 with a simplified representation of the solder jetting section, but with additional elements forming a solder deposition machine.

FIGS. 3 and 5 show a laser-assisted soldering apparatus 20 for soldering an electronic component 22, such as a circuit board. The apparatus 20 is constructed as a machine head or bond head. Therefore, the preferred field of application of the apparatus 20 is as a solder deposition machine 21, as is illustrated in FIG. 5.

The solder deposition machine 21 includes among other things a laser generating device 23 configured to produce a laser beam 7. Furthermore, the solder deposition machine 21 includes a robotic system for moving the apparatus 20 and controlling the laser beam 7 produced by the laser generating device 23 during operation. Moreover, as described in more detail below, pressure gas reservoirs 19a, 19b are provided for pressurizing different (first and second) pressure gas feeding passages 11, 18 of the apparatus 20.

FIG. 5 also shows the electronic component 22 to be applied with solder. This electronic component 22 preferably represents a through-hole device in which a pin is attached by the soldering.

As can further be seen from FIG. 5, the apparatus 20 functions to solder the electronic component 22 by using a solder body 27, such as in the form of a solder ball, which is also referred to as a "preform". This solder body 27 is liquefied and jetted by using a solder jetting section 10 of the apparatus 20. For this purpose, the solder jetting section 10 includes a solder body holding capillary 17. The capillary 17 has a main passage 35 that (preferably) extends straight through a housing 9 of the solder jetting section 10. As can also be seen in FIG. 3, the housing 9 has a plate-like design and therefore extends essentially flat along an imaginary extension plane 24 (FIG. 5). The capillary 17 penetrates the housing 9 essentially perpendicularly to the extension plane 24.

FIG. 5 shows that the capillary 17 tapers and rejuvenates towards its opening 26 at the side facing the component 22. For this purpose, the capillary 17 is provided with a jetting nozzle 34 directly forming the opening 26. This jetting nozzle 34 directly forms a passage or hole that tapers and rejuvenates towards the opening 26. The jetting nozzle 34 is attached to the housing 9. In this way, the diameter of the opening 26 of the capillary 17 is smaller than a minimal diameter of the solid solder body 27 that is used to produce a liquefied solder body. As a result, the solid solder body 27 is held at a position where the diameter of the opening 26 of the capillary 17 corresponds to the diameter of the solid solder body 27. The diameter of a solid solder body 27 in the form of a ball is preferably 500 μm or larger.

In order to jet the liquefied solder body towards the spot on the component 22 to be soldered, pressure gas is applied to the capillary 17 by a pressure gas arrangement 25. Preferably an inert gas, such as nitrogen ($N_2$), is used for this purpose.

The pressure gas arrangement 25 includes a second pressure gas feeding passage 18 that is preferably coupled to a second pressure gas reservoir 19b during operation. The second pressure gas feeding passage 18 runs at an acute angle with respect to the capillary 17. The second pressure gas feeding passage 18 is connected to the capillary 17 at a connection location 33 located between the laser exit 5 of a laser coupling unit 1 (described in more detail below) and the jetting nozzle 34. At its first end, the second pressure gas feeding passage 18 opens towards the surroundings of the housing 9 or is coupled to a pipeline 31b that runs to the second pressure gas reservoir 19b during operation. At its second end, the second pressure gas feeding passage 18 opens into, or is connected to, the main passage 35 and the capillary 17.

The pressure gas arrangement 25 functions to press a solid solder body 27 into the capillary 17 by introducing gas into the second pressure gas feeding passage 18. In order to move a solder body 27 from outside into the second pressure gas feeding passage 18, a movable element 28 such as a sliding plate or pin or a rotatable disk is moved such that a solid solder body 27 reaches the second pressure gas feeding passage 18.

Furthermore, the solder jetting section 10 interacts with the laser beam 7 that is generated in the usual way by the laser generating device 23. The laser beam 7 is supplied to the solid solder body 27 in order to produce a liquefied solder body. When the solid solder body 27 is liquefied, the liquefied solder body becomes deformed such that it can exit the opening 26 of the capillary 17 and is jetted out of the capillary 17 towards the component 22, due to the pressure inside the capillary 17.

In order to control and move the capillary 17 and to control the laser beam 7, i.e., the power and duration of the laser beam 7, and the pressure gas arrangement 25, the apparatus 20 and the solder deposition machine 21 include control and drive means (not shown). The control means are implemented by a computer including a CPU, a memory and input/output means. The memory stores a control program that is executed by the CPU. The drive means are implemented by electromechanical drives for positioning the capillary 17 and other means of the apparatus 20, e.g., holding means (not shown) for holding the electronic component 22.

The laser coupling unit 1 is attached to the housing 9 of the solder jetting section 10 during operation of the apparatus 20. The laser coupling unit 1 is attached to the housing 9 such that its laser passage 3 is connected to the capillary 17.

Figure 1:
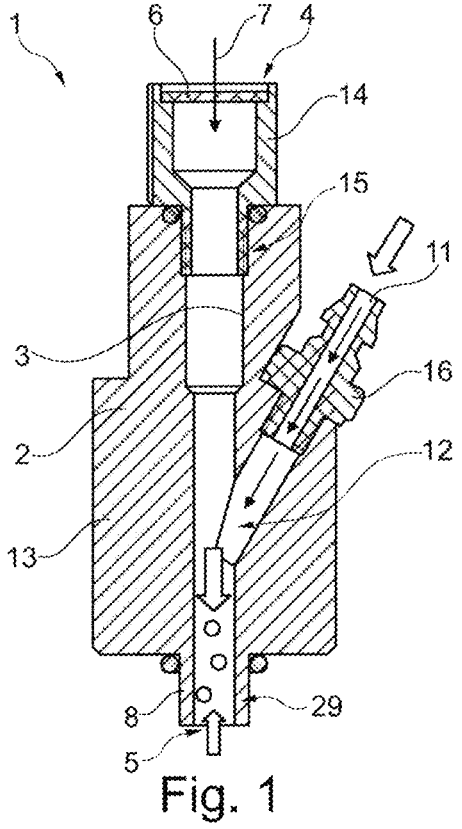
FIG. 1 shows a cross-sectional view of a laser coupling unit of a first embodiment according to the disclosure, wherein a first pressure gas feeding passage extends linearly and at an acute angle to the laser passage of a tubular body of the laser coupling unit.
Figure 2:
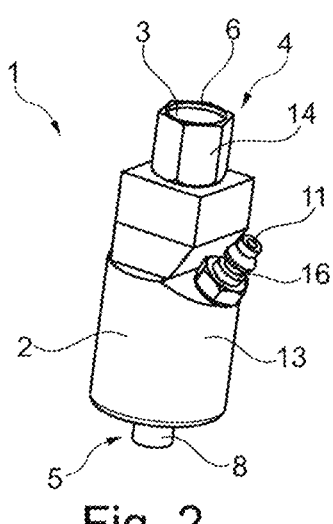
FIG. 2 a perspective view of the laser coupling unit of FIG. 1.

FIGS. 1 and 2 illustrate a first embodiment of the laser coupling unit 1. The laser coupling unit 1 has a tubular body 2. The body 2 has a longitudinal extension. The body 2 is provided with the laser passage 3 that extends straight through the entire body 2 (along the longitudinal extension).

The laser passage 3 through the body 2 has a laser entry 4 at a first end and a laser exit 5 at a second end. An optical window 6 is disposed at the laser entry 4. The window 6 is made of a material that is translucent to the laser beam 7 that is produced by the laser generating device 23. The window 6 can be made of glass or a plastic material.

At the laser exit 5, the body 2 is provided with a fastening section 8. The fastening section 8 is formed as a threaded socket. Thus, the fastening section 8 preferably includes a male thread 29. The male thread 29 of the fastening section 8 is screwed into a female thread 30 of the housing 9 in an assembled state of the apparatus 20. The fastening section 8 is positioned in such a way that the laser passage 3 is positioned concentrically to the capillary 17 in the assembled state of the apparatus 20.

In addition to the second pressure gas feeding passage 18, the laser coupling unit 1 includes a first pressure gas feeding passage 11. FIG. 5 shows that the first pressure gas feeding passage 11 is coupled to a first pressure gas reservoir 19a during operation. The first pressure gas reservoir 19a is separate from and independent of the second pressure gas reservoir 19b. In this regard, however, it is to be noted that in other embodiments, the two pressure gas feeding passages 11 and 18 could also be coupled to the same pressure gas reservoir. However, it is preferred that the first pressure gas feeding passage 11 has the same level of gas pressure or a higher level of gas pressure when compared to the gas pressure of the second pressure gas feeding passage 18.

FIG. 1 shows that the first pressure gas feeding passage 11 runs linearly and at an acute angle with respect to the laser passage 3. A first end of the first pressure gas feeding passage 11 that opens to the surroundings of the body 2 is essentially facing towards the laser entry 4. This first end is coupled to a pipeline 31*a* running to the first pressure gas reservoir 19*a* during operation.

In this conjunction it is also seen that the first pressure gas feeding passage 11 includes a pressure gas connection body part 16 that functions as a connection spigot. The pressure gas connection body part 16 forms the first end of the first pressure gas feeding passage 11 and is attached (via a screw connection) to a main body part 13 of the body 2.

The first pressure gas feeding passage 11 (at its second end) is coupled to and opens into the laser passage 3 at a connection location 12 located between the fastening section 8 and the window 6. In other words, the second end of the first pressure gas feeding passage 11 forms an outlet of the first pressure gas feeding passage 11 pointing towards the laser exit 5.

FIG. 1 also illustrates that the body 2 has several parts. The main body part 13 of the body 2 forms at least a part of the laser passage 3 and is directly provided with the fastening section 8. The section of the first pressure gas feeding passage 11 that follows the section of the pressure gas connection body part 16 is provided in this main body part 13.

A window body part 14 of the body 2 is attached to the main body part 13 opposite to the fastening section 8. The window body part 14 is connected to the main body part 13 by means of a screw connection 15. The window body part 14 forms the laser entry 4 and holds the window 6. The window body part 14 is designed as a socket and is screwed into the main body part 13. In other words, the window part 14 is provided with a threaded portion 32 (male thread) that is screwed into the main body part 13 (female thread).

Figure 4:
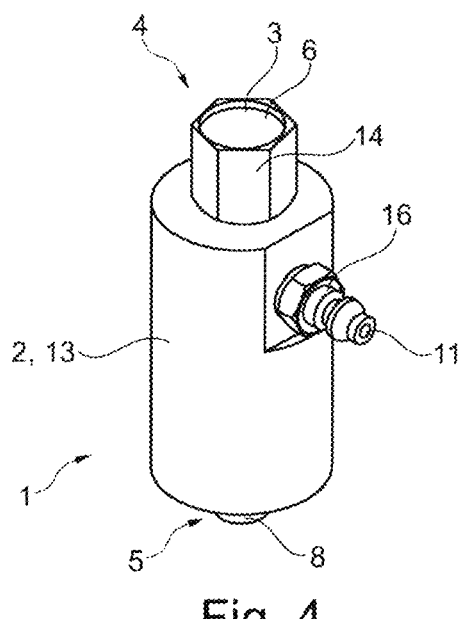
FIG. 4 shows a perspective view of a laser coupling unit of a second embodiment according to the disclosure, wherein the first pressure gas feeding passage extends linearly and perpendicular to the laser passage of the tubular body.

FIG. 4 shows a second preferred embodiment in which the first pressure gas feeding passage 11 is oriented perpendicular to the laser passage 3. The remaining construction and function of this second embodiment corresponds to that of the first embodiment.

Thus, the laser coupling unit 1 functions to elongate the capillary 17 of the housing 9 towards a side that is turned away from the opening 26 and the electronic component 22 to be soldered. As a consequence, the window 6 is positioned further away from the opening 26 and therefore from the electronic component 22 to be manufactured. By means of the first pressure gas feeding passage 11 being provided in the laser coupling unit 1, a further gas pressure inlet is provided that helps to avoid creating a contamination stream that flows against the laser beam 7, which spares the window 6 from being contaminated. Therefore, by using a laser beam 7 during the liquefying process of the solid solder body 27, the first pressure gas feeding passage 11 is provided with a certain gas pressure that forces gas out towards the opening 26 when the solder body 27 is jetted onto the electronic component 22.

LIST OF REFERENCE NUMBERS 1 laser coupling unit
2 body
3 laser passage
4 laser entry

8

5 laser exit
6 window
7 laser beam
8 fastening section
9 housing
10 solder jetting section
11 first pressure gas feeding passage
12 connection location of first pressure gas feeding passage
13 main body part
14 window body part
15 screw connection
16 pressure gas connection body part
17 solder body holding capillary
18 second pressure gas feeding passage
19*a* first pressure gas reservoir
19*b* second pressure gas reservoir
20 laser-assisted soldering apparatus
21 solder deposition machine
22 electronic component
23 laser generating device
24 extension plane
25 pressure gas arrangement
26 opening
27 solid solder body
28 movable element
29 male thread
30 female thread
31*a* pipeline
31*b* pipeline
32 threaded portion
33 connection location of second pressure gas feeding passage
34 jetting nozzle
35 main passage Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A laser-assisted soldering apparatus, comprising:
a solder jetting section that includes a jetting nozzle and a solder body holding capillary adapted to hold a solder body that is being liquefied by a laser beam; and
a laser coupling unit that includes an optical window and a body with a laser entry, a laser passage, a fastening section, and a laser exit, wherein the laser passage extends lengthwise through the body from the laser entry to the laser exit, wherein the optical window is disposed towards the laser entry and is transparent to the laser beam, wherein the fastening section is disposed towards the laser exit and is fastened to the solder jetting section, wherein a first pressure gas feeding passage merges into the laser passage at a first connection location located between the optical window and the fastening section, wherein the laser passage is aligned with the solder body holding capillary, and wherein the solder jetting section includes a second pressure gas feeding passage that merges into the solder body holding capillary at a second connection location located between the laser exit of the laser coupling unit and the jetting nozzle of the solder jetting section, wherein the body includes a main body part and a pressure gas connection body part, wherein the pressure gas connection body part is attached to the main body part, and wherein gas from the first pressure gas feeding passage enters the laser passage through the pressure gas connection body part.

2. The apparatus of claim 1, wherein the first pressure gas feeding passage and the second pressure gas feeding passage are connected to a common pressure gas reservoir.

3. The apparatus of claim 1, wherein the first pressure gas feeding passage is connected to a first pressure gas reservoir, and the second pressure gas feeding passage is connected to a second pressure gas reservoir.

4. The apparatus of claim 3, wherein the first pressure gas reservoir contains gas at a higher pressure than that contained in the second pressure gas reservoir.

5. The apparatus of claim 1, wherein the body of the laser coupling unit is cylindrical.

6. The apparatus of claim 1, wherein the first pressure gas feeding passage has an outlet that is directed towards the laser exit.

7. The apparatus of claim 1, wherein the first pressure gas feeding passage merges into the laser passage at an acute angle.

8. The apparatus of claim 1, wherein the first pressure gas feeding passage merges perpendicularly into the laser passage.

9. The apparatus of claim 1, wherein the body includes a a window body part, wherein the window body part screws into the main body part, and wherein the optical window is attached to the window body part.

10. The apparatus of claim 1, wherein the fastening section of the laser coupling unit screws into the solder jetting section.

11. The apparatus of claim 1, wherein the body includes a window body part, wherein the window body part screws into the main body part, wherein the pressure gas connection body part screws into the main body part, and wherein the fastening section screws into the solder jetting section.

* * * * *